United States Patent [19]

Leuthold et al.

[11] Patent Number: 5,057,753
[45] Date of Patent: Oct. 15, 1991

[54] PHASE COMMUTATION CIRCUIT FOR BRUSHLESS DC MOTORS USING A SPIKE INSENSITIVE BACK EMF DETECTION METHOD

[75] Inventors: Hans M. Leuthold; Felix De Herrera, both of Santa Cruz, Calif.

[73] Assignee: Seagate Technology, Inc., Scotts Valley, Calif.

[21] Appl. No.: 546,512

[22] Filed: Jun. 29, 1990

[51] Int. Cl.$^5$ .............................................. H02P 6/02
[52] U.S. Cl. ..................................... 318/254; 318/138
[58] Field of Search ........................ 318/254, 138, 439

[56] References Cited

U.S. PATENT DOCUMENTS

| | | |
|---|---|---|
| 4,250,435 | 2/1981 | Alley et al. ........................... 318/138 |
| 4,641,066 | 2/1987 | Nagata et al. ........................ 318/138 |
| 4,642,536 | 2/1987 | Boyd, Jr. et al. .................... 318/138 |
| 4,642,537 | 2/1987 | Young .................................... 318/138 |
| 4,874,993 | 10/1989 | Tanaka et al. ....................... 318/254 |

Primary Examiner—David Smith, Jr.
Attorney, Agent, or Firm—Flehr, Hohbach, Test, Albritton & Herbert

[57] ABSTRACT

Apparatus for controlling phase commutation of a brushless DC motor. The apparatus is comprised of a back EMF detection technique to determine the current position of the rotor, an error rejection circuit to prohibit commutation noise from causing errors in determining the present rotor position, a means for determining the next phase set to energize and proper energization timing to maintain a lead angle between the physical rotor position and the magnetic wave, and a means for driving the appropriate brushless DC motor phases with current.

12 Claims, 7 Drawing Sheets

PHASE COMMUTATION CIRCUIT FOR BRUSHLESS DC MOTORS USING A SPIKE INSENSITIVE BACK EMF DETECTION METHOD

The present invention relates generally to a method and apparatus for use with brushless DC motors, and particularly, to a method and apparatus for controlling phase commutation in a brushless DC motor.

BACKGROUND OF THE INVENTION

The present invention is an improvement upon commonly used back EMF detection methods for determining the proper commutation of currents in a brushless DC motor. In general, these well known methods detect the back EMF by monitoring the motor phases. The points in time at which the back EMF signal crosses from a positive amplitude to a negative amplitude, known in the art as a zero-crossing, are determined and from this information the commutation order and speed is determined.

The phase shift or lead angle between the back EMF and phase-current signals of corresponding phases is an important factor to the quality of the commutation control. It has, for example, an impact on the instantaneous motor torque and the vibrations developed by the motor. The optimum value of this lead angle depends on the running mode of the motor; specifically, start, acceleration, steady state, braking. Consequently, the lead angle must be variable.

The back electromotive force (back EMF) is a movement induced voltage (French expression: tension induite de mouvement). It is therefore determinative of the geometrical position of the rotor. Thus, detecting the back EMF zero crossings for each phase enables the commutation control circuits to know the speed and position of the rotor and tailor the commutation rate, or more specifically, the lead angle dependent instant of commutation, to the current state of the motor. It is very important that the back EMF signal be detected without error.

However, it is well known in the art that commutating the motor phases will cause electrical noise. The noise is usually in the form of phase tap voltage spikes which can be large enough to cause anomalous zero-crossing detection by the back EMF monitoring apparatus.

Heretofore, attempts have been made to mitigate the effect of the spikes by filtering the phase tap voltage signal. However, filtering also distorts the zero-crossing timing and may lead to complicated circuitry.

It is very important that the commutation control apparatus commutates the motor phases prior to the alignment of the rotor with the energized phases. In other words, the commutation control apparatus maintains the lead angle between the rotational position of the magnetic wave and the physical rotational position of the rotor. The magnitude of the lead angle is important in controlling motor acceleration. During braking, a lagging angle is maintained. In some applications, the magnetic wave and physical rotational position of the rotor are synchronous.

The objective of the present invention is to provide a simple means to eliminate the effects of voltage spikes caused by phase commutation upon back EMF detection apparatus.

Another object of the present invention is to provide a means by which the lead angle of the commutation is controlled.

SUMMARY OF THE INVENTION

In summary, the present invention is a method and apparatus for accurately controlling commutation of the phases in a brushless DC motor while eliminating the detrimental effects of voltage spike noise on the commutation control circuits. The invention detects the back EMF signal (and noise) zero-crossings, creates a pulse stream representing all these zero-crossings, processes the pulse stream such that the noise is eliminated, uses the corrected pulse stream to determine the appropriate lead angle between the magnetic wave in the motor and the physical location of the rotor, and commutates the phases to maintain the lead angle and rotor motion. The lead angle can be varied in response to the motor state, e.g., acceleration, nominal speed maintenance, or braking.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1A:
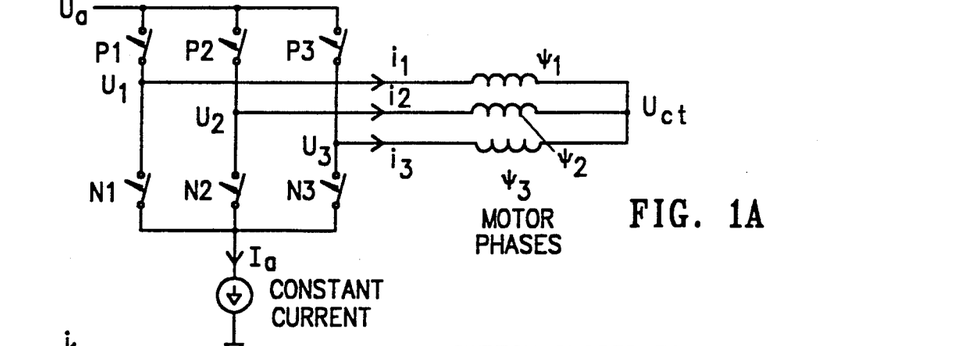
FIG. 1A schematically depicts the phase commutation circuitry.
Figure 1B:
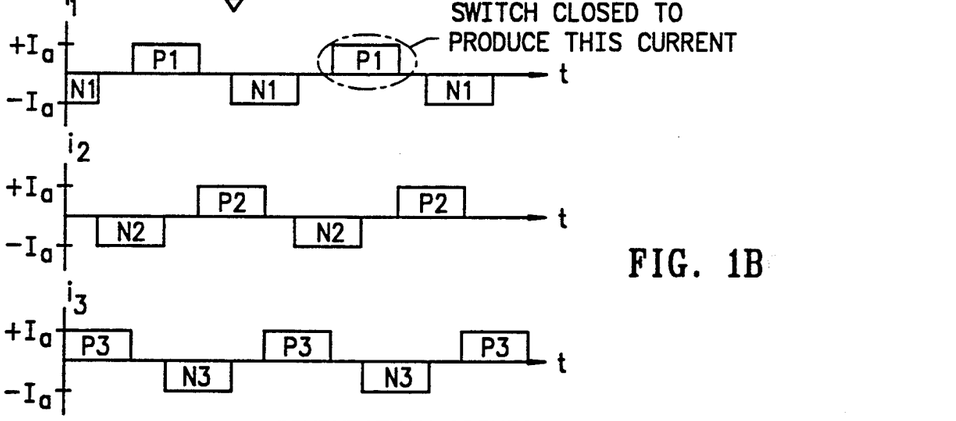
FIG. 1B illustrates the drive current in each phase as the motor is commutated.

Referring to FIG. 1, there is shown the phase current and phase tap voltage of a three-phase brushless DC motor as supplied through a 120 degree conduction power bridge. FIG 1A depicts a simple schematic of a typical phase current commutation circuit. The phase currents of FIG. 1B are commutated by switching the switches P1, N1, P2, N2, P3, N3 of FIG. 1A. The switches are typically semiconductor devices.

Figure 1C:
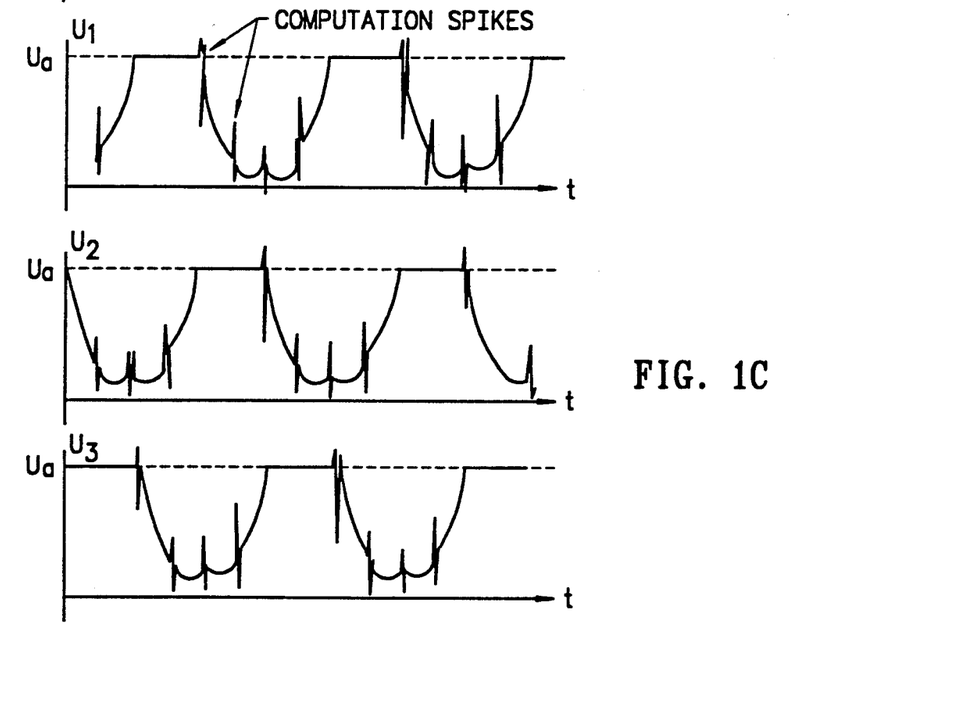
FIG. 1C depicts the phase tap voltage signal as it appears across each phase.

The phase tap voltages of FIG. 1C depend on both the back EMF and the voltage spikes resulting from the commutation. This relationship is governed by the phase voltage equation. This equation is part of the basic knowhow in electrical motor engineering, and describes the influence of the phase current, the derivatives of the phase current, the derivatives of the magnetically coupled phase currents, and the back EMF voltage on the phase tap voltage.

Figure 2:
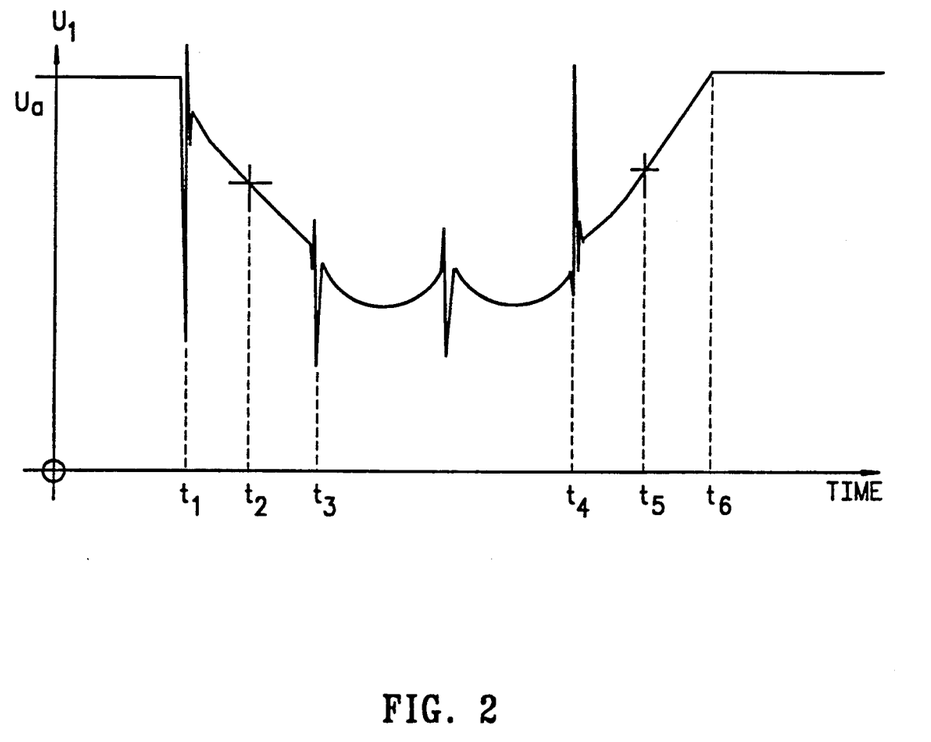
FIG. 2 shows a detailed view of a typical phase tap voltage signal.

FIG. 2 illustrates the relationship between the phase tap voltage $U_1$ of FIG. 1C, the corresponding back EMF signal and the phase commutation cycle. The same illustration might be done for $U_2$ and $U_3$. At $t_1$, switch P1 of FIG. 1A is opened due to the zero-crossing detection on phase 2. The opening of P1 causes current to stop flowing in phase 1 and causes the phase 1 tap voltage to float. The phase tap voltage is the aggregate of the back EMF and the center tap voltage $v_{ct}$.

At $t_2$, the back EMF crossover is detected. This is the so-called zero-crossing. As the back EMF crosses a fixed voltage threshold, not truly a zero-crossing, the detection circuitry responds with a pulse.

At $t_3$, switch N1 is closed applying a negative current to phase 1. The delay between $t_2$ and $t_3$ determines the lead angle, and is sometimes called commutation, ignition or firing angle. In a so-called 120 degree conduction power bridge, the relationship between the commutation angle and the lead angle is:

commutation angle = 30° + lead angle (electrical degrees)

where the lead angle is defined as the angle between the magnetic wave and the physical position of the rotor.

At $t_4$, N1 is opened in response to the zero-crossing detected in phase 2.

At $t_5$, the back EMF again crosses the voltage threshold turning off the pulse that was begun at $t_2$. After the commutation angle delay, switch P1 is closed at $t_6$. This cycle is repeated for each phase.

Since the zero-crossing pulses are created using a voltage comparison, any voltage spikes appearing in the phase tap voltage will cause erroneous pulses. Consequently, if the commutation cycle depends on these erroneous signals, major timing errors could result.

Figure 3:
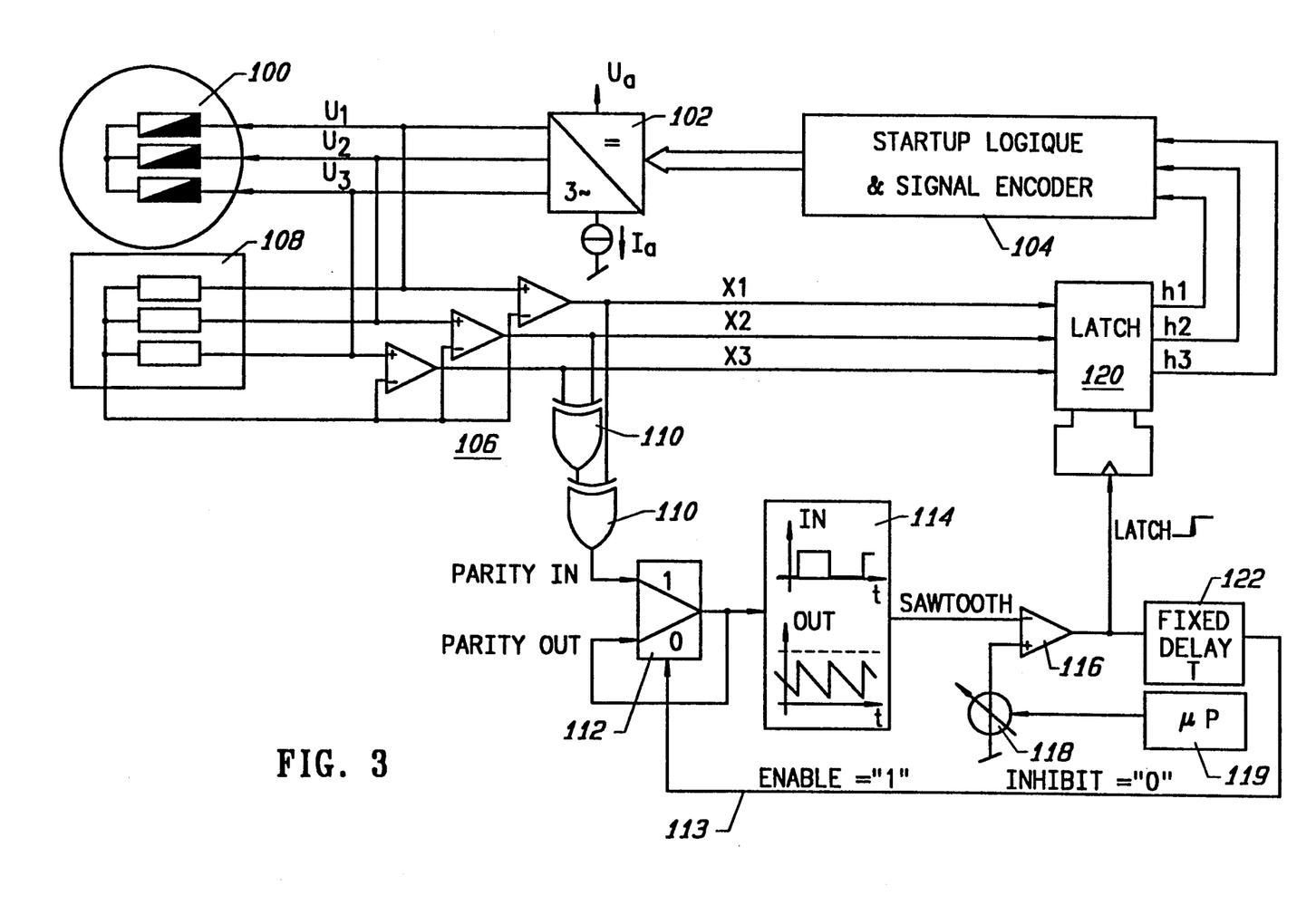
FIG. 3 illustrates the preferred embodiment of the present invention in block diagram form.

The preferred embodiment of the present invention eliminates all such errors. The apparatus is depicted in block diagram form in FIG. 3. To aid in understanding the operation of the apparatus, a signal timing diagram is provided in FIG. 4. This example depicts the present invention operating in conjunction with a three-phase, Y wound motor. However, any number of phases, wound in any configuration could be accommodated by the present invention. For this example, it is assumed that the motor has previously been started using any one of the methods known in the art for starting a motor in the proper direction.

The brushless DC motor 100 of the exemplary embodiment is driven by a three-phase power bridge 102 which commutates the phases as instructed by the start-up logic and signal encoder 104 whose functions will be explained in detail below. The current $I_a$ through the bridge 102 is determined by speed regulating circuitry that is well known in the art. Typically, a three-phase power bridge has the form of the simple commutation circuit of FIG. 1A; however, the switches are in reality power transistors which are pulsed in the commutation order shown in FIG. 1B by the signal encoder 104.

Figure 4:
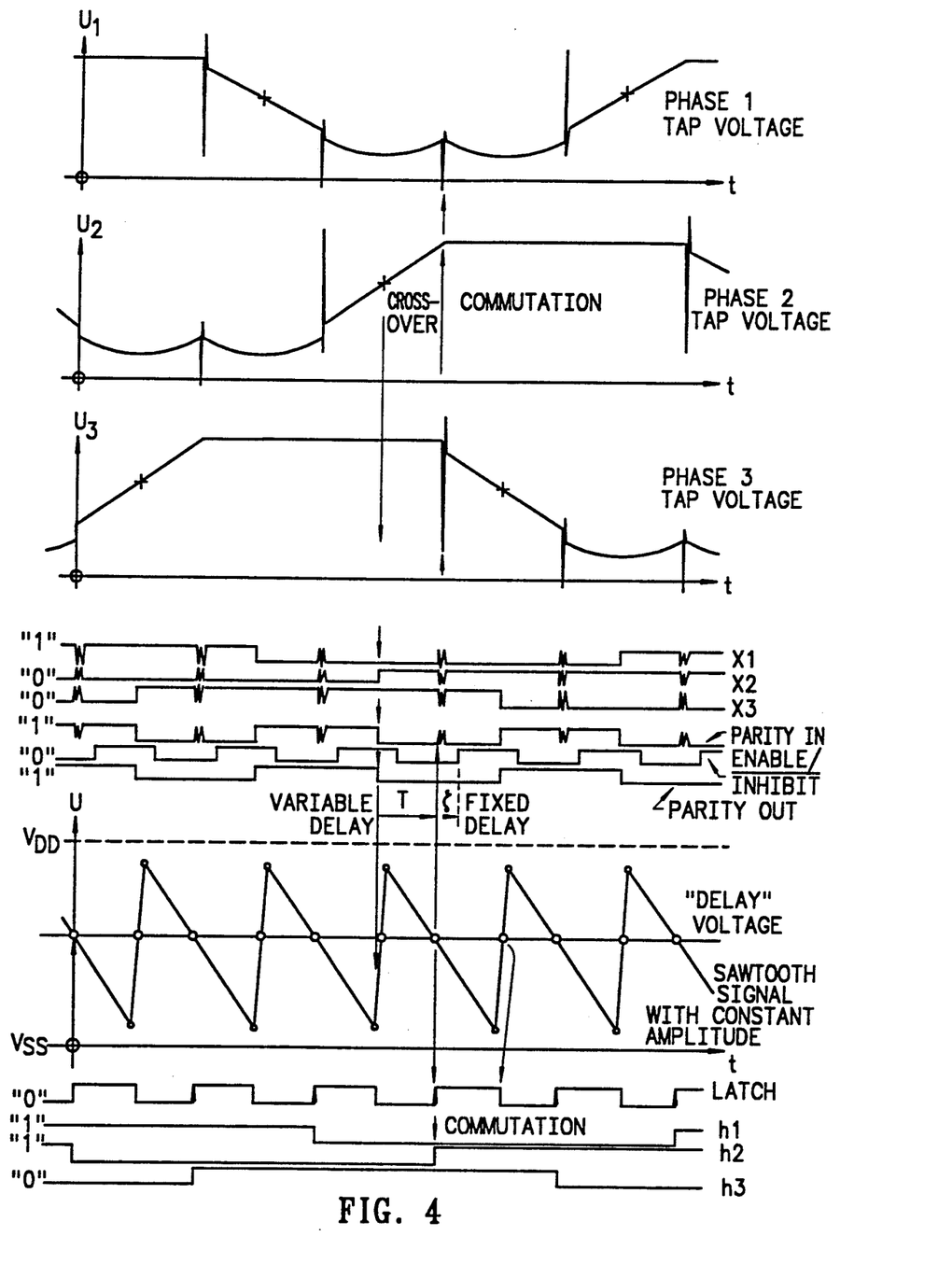
FIG. 4 represents the signal timing for FIG. 3.

The back EMF signal zero-crossings are detected by the comparators at 106. The phase tap voltage signals $u_1$, $u_2$, and $u_3$ and the comparators' 106 outputs $x_1$, $x_2$, and $x_3$ are illustrated in FIG. 4. The distorted portions of signals $x_1$, $x_2$, and $x_3$ denote where commutation spikes may cause errors. The centertap voltage $v_{ct}$ provides the threshold for the zero-crossing comparison. $v_{ct}$ provides a stable source which fluctuates with anomalies in motor and power supply characteristics in the same degree as the values of the phase tap voltages are affected. Thus, the voltage threshold is self compensating. However, in some motors, the center tap voltage is not available for use as a threshold voltage.

If the centertap of the motor phases is not available, as it is the case for delta wound motors, a simulated centertap 108 can be utilized. The simulated centertap 108 is comprised of three resistors wired in a star configuration. A technique called star-delta transform is basic know-how in electrical engineering. The transform proves that the star connected simulated centertap may be used for both, star and delta connected motors. The values of the three equivalent resistors are chosen such that current flowing through the resistors will be insignificant with respect to the motor phase current. This ensures that the simulated centertap voltage will approximate the actual centertap voltage, including flunctuations due to motor and power supply anomalies.

The comparators 106 compare the back EMF signals $u_1$, $u_2$, and $u_3$ to the centertap voltage $v_{ct}$ and create digital pulses $x_1$, $x_2$, and $x_3$ in response to the threshold crossings. However, at this point, any noise spikes due to commutation are also converted into digital signals if they are large enough in magnitude to cross the threshold.

The pair of XOR gates 110 converts the three parallel pulse streams $x_1$, $x_2$, and $x_3$ into a single representative stream of pulses PARITY IN. The output signal PARITY IN will change state upon a zero-crossing of any of the three phases. This circuit 110 is called a parity checker. The erroneous signals caused by the commutation spikes are present in the signal PARITY IN as shown in FIG. 4.

The store-gate 112 inhibits the transmission of spikes to the sawtooth generator 114 according to the state of the enable/inhibit signal 113. The operation of items 113 and 114 is discussed further below. Whenever the ENABLE/INHIBIT line carries the "enable" state which is active high or "1", the output signal PARITY-OUT of the store gate is equal to the input PARITY-IN. As the ENABLE/INHIBIT line turns to its "INHIBIT" state, which is active low or "0", the PARITY-IN signal present during the falling edge is memorized and remains on the output PARITY-OUT. The output from the store-gate 112 is, therefore, a bit stream that represents the zero-crossings of the back EMF, but does not include the errors caused by the spikes. The transitions caused by the voltage spikes have been eliminated because the inhibit signal is present during the periods that the spikes are present.

One feature of the present invention is that the commutation occurs at a commutation angle that is variable depending upon the motor's state, i.e., accelerating, nominal speed, or braking. This feature is accomplished by devices 114, 116 and 118. A sawtooth waveform generator 114 is triggered by the output of the store-gate 112. The amplitude of the sawtooth signal is constant and independent of the rotating speed of the motor. As the linearly falling signal drops below the voltage threshold set by the voltage source 118, the comparator 116 will toggle. The point in time at which the output toggles define a variable delay T which is proportional to both, the magnitude of the voltage threshold and the time period between two phase commutations. This occurs because the falling edge of the sawtooth wave is a linear function of time, and because the amplitude of the sawtooth wave is constant. The variable delay T corresponds to the commutation angle and therefore determines the lead angle of the motor. The reference voltage source 118 can be controlled by a microprocessor 119 to adjust the delay time T, and consequently the lead angle, depending on the current motor state.

Figure 5:
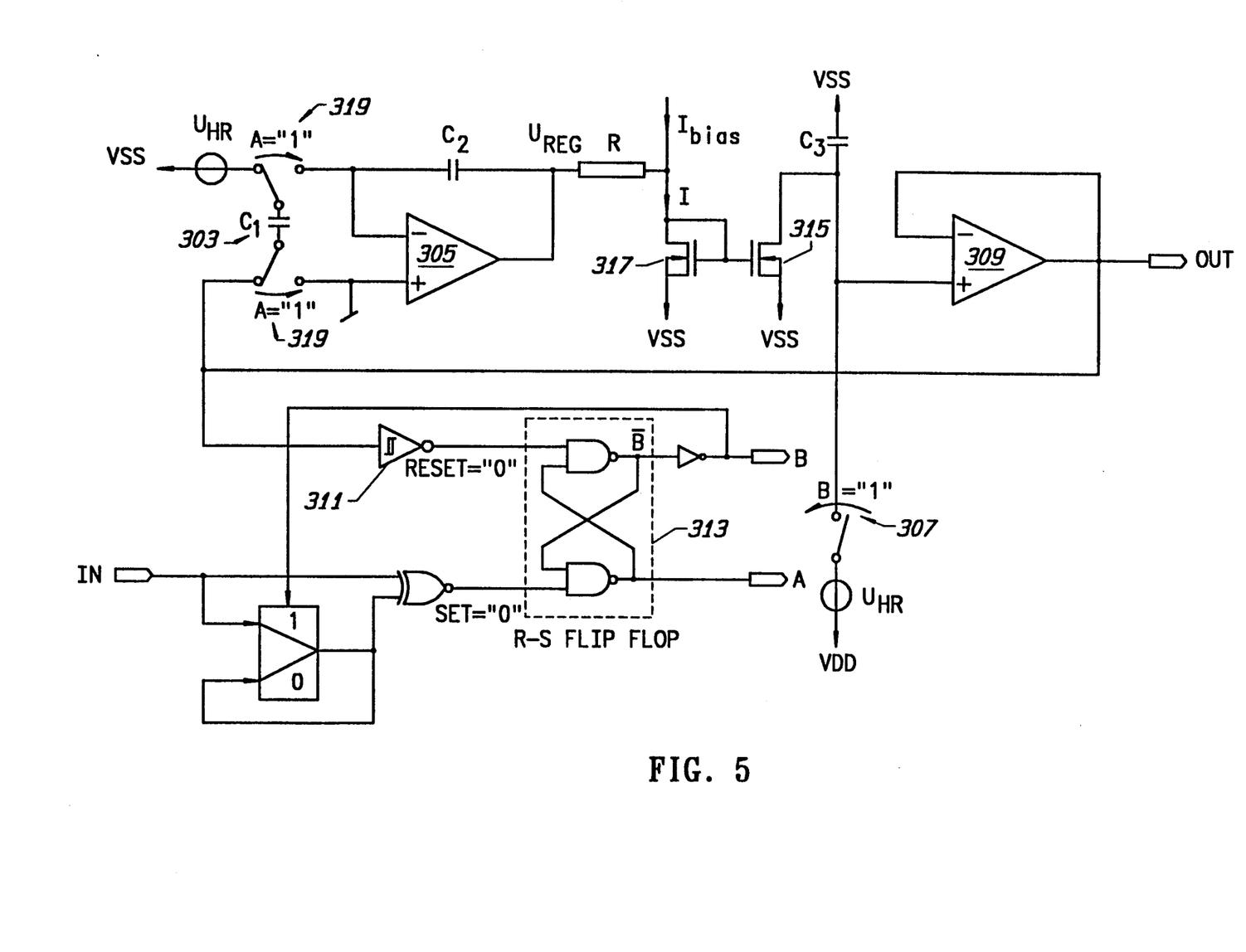
FIG. 5 schematically depicts a sawtooth waveform generator.
Figure 6:
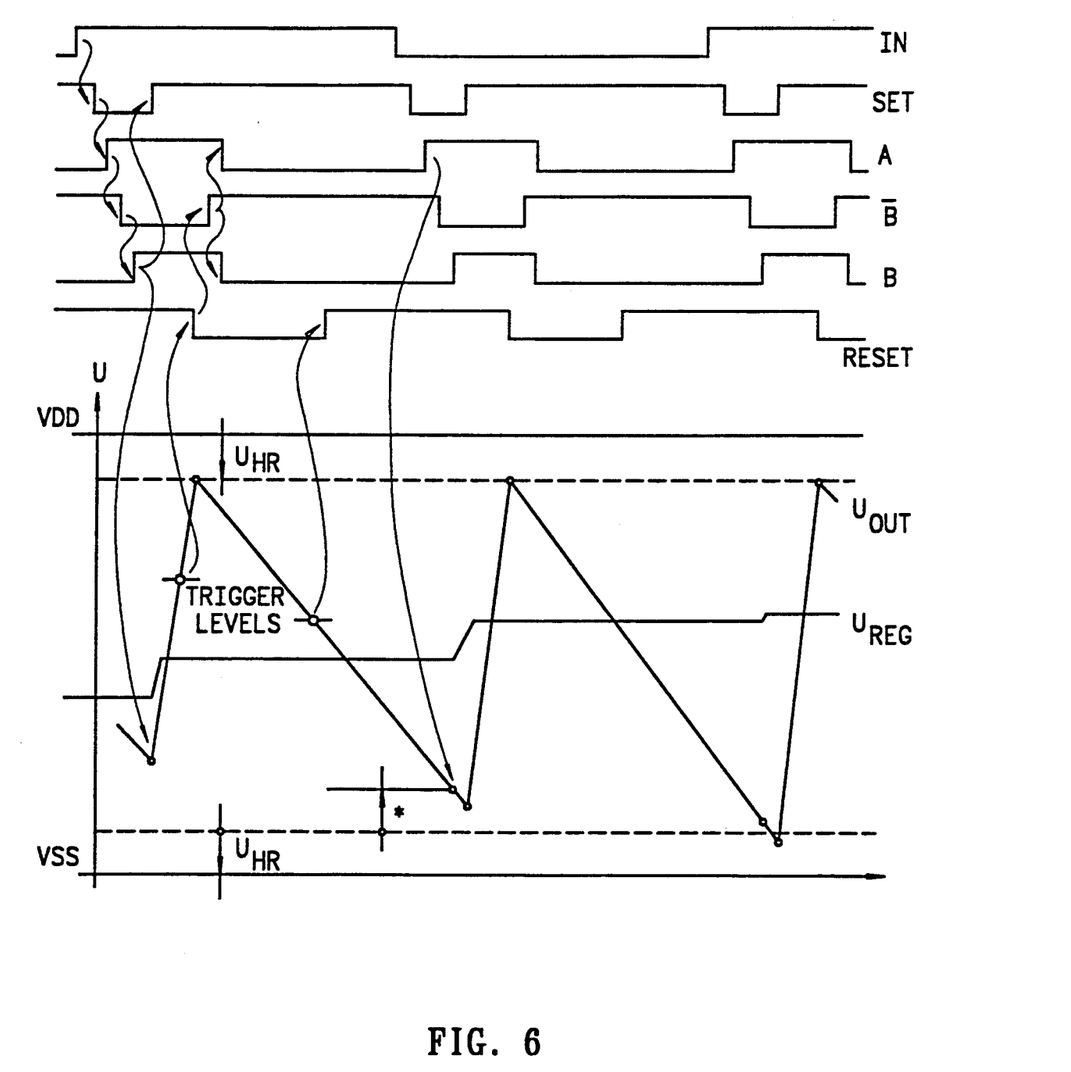
FIG. 6 is a signal timing diagram for FIG. 5.

A means for generating a constant amplitude sawtooth waveform is depicted in FIG. 5 and its signal timing diagram appears in FIG. 6. This circuit is a typical saw wave generation circuit and is not meant to be exclusive to this invention. In general, the input pulse stream IN controls the charge and discharge cycle of capacitor 301; while capacitor 303, the reference voltage $u_{HR}$, and the integrator 305 control the amplitude of the saw wave.

At start-up, the input pulse IN switches to a high state causing signal SET to switch to a low state and signals A and B to switch to a high state. The high value of signal B switches 307 into the closed position which charges capacitor 301 towards the voltage $V_{DD}$ minus the reference voltage $u_{HR}$ as shown in FIG. 6. The charging of the capacitor is very fast.

As the output voltage of buffer amplifier 309 rises due to the charging of 301, the Schmitt trigger 311 will switch states. This resets the R-S flip flop ($U_3$ and $U_4$) 313, and subsequently, changes the states of both A and B. By this time, capacitor 301 has charged to its full value and begins discharging when 307 is opened. 301 discharges through 315 at a rate controlled by the current mirror 315 and 317. A linear discharge curve is created.

The Schmitt trigger 311 will change states again as the output voltage falls below its trigger point. The circuitry has now been reset to its initial state and awaits the next edge (falling) of the input signal IN as the voltage continues to discharge from 301.

At the falling edge of IN, the charging cycle will begin again. However, at the instant the edge of IN falls capacitor 303 will be charged with a voltage equivalent to the difference between the reference voltage $u_{HR}$ and the minimum output voltage OUT. Ideally these two voltages will be the same for a constant amplitude sawtooth waveform. If they are not equivalent, the error voltage charged on 303 will be applied to the integrator 305 when signal A attains the high state (switch 319 closed). The error correction scheme below depicts the case of an amplitude which is too small, but applies also to the opposite case where the amplitude is too large. In that case, the signal signs are inverted and the bias current is decreased rather than increased with a goal of reducing the sawtooth amplitude. Continuing with the example of an amplitude that is too small, the integrated voltage difference will cause voltage $u_{reg}$ to rise. Subsequently, this increases the bias current I and, due to the current mirror, will increase the discharge current of 301 causing the voltage to discharge faster. The objective is to discharge 301 to a level equal to $u_{HR}$ during every cycle. The current adjustment will be repeated with each cycle of the circuitry until the reference voltage $u_{HR}$ is identical to the minimum discharge voltage of the output waveform. At that point, the saw wave will have a constant amplitude as depicted in FIG. 6.

Returning to FIG. 3, the variably delayed pulse from comparator 116 triggers the latch 120 allowing the back EMF pulse set $x_1$, $x_2$, and $x_3$ to be latched and sent to the signal encoder to be processed. As depicted in FIG. 4, the latch 120 is triggered by the output of comparator 116 prior to the next potential error producing commutation spike. The delay time is set by the threshold voltage source 118 which is controlled by a microprocessor 119. The delay may be set at the factory or actively adjusted while the system is operational in the field. Therefore, the latch timing signal in conjunction with the signal encoder 104 creates the lead angle between the magnetic wave in the motor and the physical location of the rotor. The signal encoder 104 determines which phases will be energized next to ensure that the rotor maintains its motion. Typically, this function is accomplished by using the latch bits, representing the current physical rotor position, as a pointer into a lookup table to designate the next set of phases to be energized. Since the latch is controlled by the corrected pulse stream, there is certainty that the latched bits, $h_1$, $h_2$, and $h_3$, will not be erroneous. Error would result if the latched signals were representative of the voltage spikes caused by the abruptly changing currents flowing through the motor windings. The use of the present invention ensures that the latch signal will not latch the back EMF pulse set $x_1$, $x_2$, and $x_3$ during the period when voltage spikes are causing oscillations of those signals.

The variably delayed signal, used to trigger the latch, is delayed by a fixed amount 122 equivalent to the time between the phase commutation and the disappearance of the phasetap voltage spikes. As shown in FIG. 4, the delayed signal 113, known as the ENABLE/INHIBIT signal, is maintained in the INHIBIT state during the delay period, designated tau, to inhibit the store-gate 112 from changing state. Thus, the store-gate is guaranteed to remain in the inhibited state from the beginning of a phase commutation until the voltage spikes have disappeared.

In summary, the present invention has two major features which need reiteration. The first feature is the use of the back EMF sampling circuitry to provide simple apparatus to adjust the lead angle between the magnetic wave and the rotor position. Second, the present invention provides apparatus to eliminate the deleterious effects of the voltage spikes caused by commutation.

Figure 7:
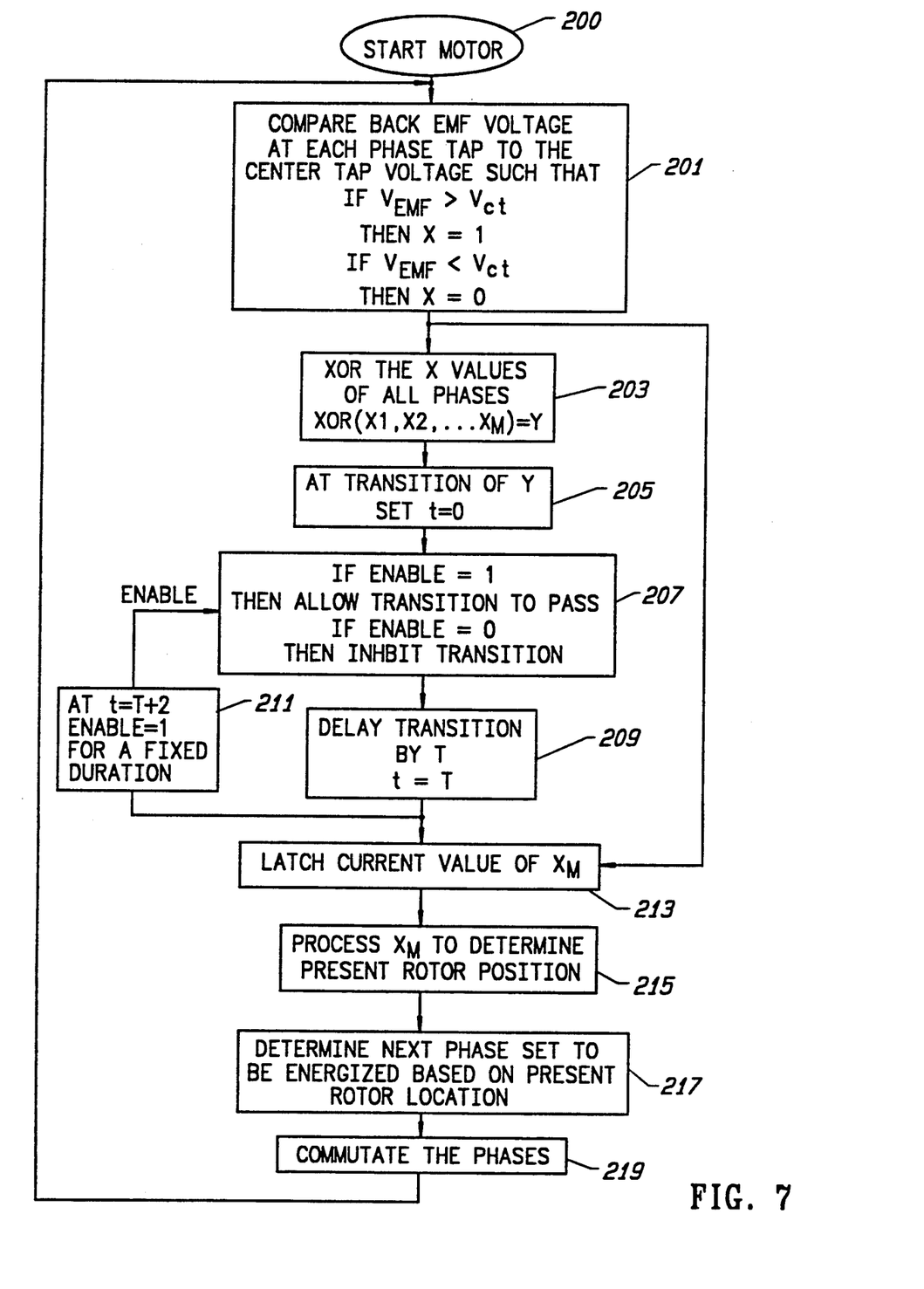
FIG. 7 is a flow chart summarizing the method of the present invention.

The method of the present invention is best summarized by the flow charts of FIGS. 7A and 7B. They represent the inverted method as the sum of two paralleled and synchronized processes, the back EMF detection loop (FIG. 7A) and the timing loop (FIG. 7B). The present method is only useful after the motor is started in step 200. In step 201, a process for converting the analog phasetap voltage signal into a digital representation is accomplished. Most simply, the detection loop detects when the phasetap voltage signal is larger than the centertap voltage and represents that period with a 1. Correspondingly, when the phasetap voltage has a lesser amplitude than the center tap voltage, a zero is used to represent the signal. Thus, the output of step 201 is a series of ones and zeros for each phase represented by $x_1, x_2, \ldots, x_m$. These values are used in the detection loop and are also exported to the timing loop, step 311.

In step 203, the pulse streams of each phase are XORed together producing a single pulse sequence which represents all of the phasetap voltage transitions about the center tap voltage. In the flow chart of FIG. 7A, the pulse sequence is represented by Y.

Step 205 acts as a gate allowing the signal Y to pass while the enable signal is a one. Conversely, when the enable signal is a zero the former state of the signal Y remains stored. If the step 205 query is answered affirmatively and a parity transition has occurred to satisfy step 207, the timing loop is reset (step 209) and the ENABLE signal is reset (step 211). Notification that a timing loop reset has occurred is sent to the timing loop.

The timing loop initially sets ENABLE 1 at step 301 This information is sent to the detection loop step 205.

At step 303, a wait loop is initiated until the reset timing loop signal is received from step 209 of the detection loop. At this occurrence, system time is set to zero, 307, and the duration of the delay T is determined. T can be fixed or adaptive via the use of a microprocessor. At step 309, the process waits until duration T passes.

At this point, the current digitized values of the phase tap voltages $X_m$ are latched at step 311. From these values, the rotor position is determined 313, and the next set of phases to be energized are selected 315. Most simply, the phase tap voltage signals provide a unique set of bits that can be used as a pointer into a look-up table to determine the present position of the rotor. A second look-up table, in step 315, uses the present location of the rotor to determine which phase combination must be energized next to maintain the rotor motion. The selected phases are commutated at step 317.

Lastly, the process waits for a fixed duration $\tau$ before repeating the process by setting ENABLE=1 at step 301. Note that the detection loop previously set ENABLE=0 at step 211.

The net result is that the phase tap voltage $X_m$ are only latched when ENABLE=1 and a parity transition occurs. At all other times, the signals are inhibited (ENABLE=0), thus the phase tap voltage spikes due to commutation do not interfere with accurate rotor position detection.

While the present invention has been described with reference to a specific embodiment, the description is illustrative of the invention and is not to be construed as limiting the invention. Various modifications may occur to those skilled in the art without departing from the true spirit and scope of the invention as defined by the appended claims.

What is claimed is:

1. In a brushless DC motor comprising a plurality of windings to define m phases of said motor, a permanent magnet or DC current excitation winding positioned relative to said windings and rotatable relative to said windings and comprising means for establishing fixed first magnetic fields, commutation apparatus comprising;

driver means connected to said plurality of windings for applying a current pulse to at least one phase thereof inducing at least one second, controlled magnetic field, which interacts with said fixed first magnetic fields causing rotation of said permanent magnet;

commutation means for controlling said driver means to apply said current pulse to said phase in a timed and orderly manner, maintaining said rotation of said permanent magnet;

detection means for detecting back EMF signals from said plurality of windings and generating detected back EMF signals;

latching means for latching said detected back EMF signals;

parity checking means for combining said detected back EMF signals into a single digital bit stream having a transition representing each detected back EMF zero crossing;

gating means for inhibiting passage of said single digital bit stream during periods of commutation noise and for enabling passage of single digital bit stream at all other times;

first delay means for delaying said transitions of said single bit stream which occur during said gating enablement, said delayed transitions causing said latching means to latch; and second delay means for delaying said transitions of said single bit stream to provide delayed signal for enabling said gating means.

2. The commutation apparatus of claim 1 wherein said detection means includes a plurality of comparators equivalent to the number of phases in said motor, where each comparator has said phasetap voltage signal as one input from a respective phase and the centertap voltage as the second input, such that each comparator switches states each time said phasetap voltage signal crosses said the centertap voltage.

3. The commutation apparatus of claim 1 wherein said detection means includes a simulated centertap circuit comprising a plurality of resistors equivalent to the number of said phases of said motor connected in a star configuration, and connected to said driver means to provide a voltage representative of the centertap voltage of said motor.

4. The commutation apparatus of claim 3 wherein said detection means includes a plurality of comparators equivalent to the number of phases in said motor, where each comparator has said phase tap voltage signal as one input from a respective phase and said representative centertap voltage as the second input, such that each comparator switches states each time said phasetap voltage signal crosses said representative centertap voltage.

5. The commutation apparatus of claim 1 wherein said driver means is a power bridge controlled by said commutation means and connected to each phase of said motor for applying a current pulse to at least one phase thereof inducing at least one second, controlled magnetic field, which interacts with said fixed first magnetic fields causing rotation of said permanent magnet.

6. The commutation apparatus of claim 1 wherein said commutation means includes a signal encoding means for processing the output of said latching means to determine the current rotor position and the next set of said phase pairs to be energized by said driver means to maintain rotor motion.

7. The commutation apparatus of claim 1 wherein said parity checking means is a circuit that exclusively ORs said detected phasetap voltage signals into said single bit stream.

8. The commutation apparatus of claim 1 wherein said second delay means delays the output of said first delay means by a fixed duration substantially equivalent to the time duration between the initiation of commutations of said motor phases and the disappearance of said excessive noise creating a doubly delayed bit stream to create an enabling signal for said gating means.

9. The commutation apparatus of claim 1 wherein said first delay means has a variable delay.

10. The commutation apparatus of claim 9 wherein said first delay means includes an edge triggered sawtooth waveform generator responsive to each state change of said single bit stream to create a sawtooth waveform and a comparator which compares said sawtooth waveform with a reference voltage source producing a bit stream with each transition being identical to said single bit stream, but delayed by an amount of time corresponding to the duration from the sawtooth waveform generator trigger to the time when the comparator changes state.

11. The commutation apparatus of claim 10 wherein said reference voltage source is variable according to the desired lead angle for said motor.

12. In a commutatorless DC motor comprising a plurality of windings to define m phases of said motor, a permanent magnet or DC current excitation winding positioned relative to said windings and rotatable relative to said windings and comprising means for establishing, fixed first magnetic fields, commutation method including the steps of:

comparing the back EMF voltage on each of said phases to the centertap voltage;

representing said back EMF voltage that is greater than said centertap voltage by a digital one and representing said back EMF voltage that is less than said centertap voltage by a digital zero, creating a digital representation of said back EMF signal for each of said phases;

combining said digital representations for each of said phases by using a logical exclusive OR and creating a single bit stream;

gating said single bit stream;

delaying said single bit stream by a variable duration;

delaying said single bit stream a second duration of fixed length creating a gate enabling signal;

using said gate enabling signal to enable said gating of said single bit stream, at all other times said single bit stream is inhibited from passing through the gate;

latching said digital representations using a transition of said delayed single bit stream;

processing said latched digital representations to determine the current rotor position and the next phase combination to be energized to maintain rotor motion; and commutating the phases based upon said processing.

* * * * *